(12) United States Patent
Tsai et al.

(10) Patent No.: US 10,609,745 B2
(45) Date of Patent: Mar. 31, 2020

(54) METHOD AND SYSTEM FOR PAIRING AUTHENTICATION BETWEEN A VEHICLE AND A MOBILE DEVICE

(71) Applicant: KWANG YANG MOTOR CO., LTD., Kaohsiung (TW)

(72) Inventors: Yi-Yang Tsai, Kaohsiung (TW); Hsi-Kun Chen, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 206 days.

(21) Appl. No.: 15/784,288

(22) Filed: Oct. 16, 2017

(65) Prior Publication Data

US 2018/0255592 A1    Sep. 6, 2018

(30) Foreign Application Priority Data

Mar. 6, 2017  (TW) .............................. 106107149 A

(51) Int. Cl.
*H04W 76/00*    (2018.01)
*H04W 12/06*    (2009.01)
(Continued)

(52) U.S. Cl.
CPC ............. *H04W 76/14* (2018.02); *B60K 35/00* (2013.01); *G06F 3/147* (2013.01); *G06F 3/1423* (2013.01); *G09G 5/12* (2013.01); *H04L 67/12* (2013.01); *H04W 12/003* (2019.01); *H04W 12/06* (2013.01); *B60K 2370/563* (2019.05); *B60K 2370/569* (2019.05); *B60K 2370/573* (2019.05); *B60K 2370/586* (2019.05); *G06F 3/04842* (2013.01); *G09G 2358/00* (2013.01); *G09G 2370/06* (2013.01); *H04W 4/48* (2018.02); *H04W 4/80* (2018.02); *H04W 8/005* (2013.01)

(58) Field of Classification Search
USPC ....................................................... 455/41.2
See application file for complete search history.

(56) References Cited

U.S. PATENT DOCUMENTS 7,356,347 B1 *  4/2008  Kammer .......... H04L 29/12122
                                                    455/517
9,771,122 B1 *  9/2017  Felicilda ................ B62K 11/14
(Continued)

OTHER PUBLICATIONS

"Bluetooth Pairing Instructions", Sep. 1, 2009, pp. 1-10, XP055164800, Retrieved from the Internet: https://web.archive.org/web/20150529045533/www.bmw.ca/ca/en/owners/navigation/bluetooth/_shared/pdf/Bluetooth_pairing_pdf_en.pdf (Year: 2009).*
(Continued)

*Primary Examiner* — Yuwen Pan
*Assistant Examiner* — Erica L Fleming-Hall
(74) *Attorney, Agent, or Firm* — Brinks Gilson & Lione

(57) ABSTRACT

A method for pairing authentication between a vehicle and a mobile device is proposed. After a host computer of the vehicle is operated to send out a vehicle identification code for pairing and the mobile device is operated to select the vehicle identification code, the host computer enables both of a host display of the vehicle and the mobile device to display a pairing code at the same time. After a pairing procedure is performed within a predetermined pairing operation period, the host computer completes pairing authentication between the host computer and the mobile device.

14 Claims, 14 Drawing Sheets

(51) Int. Cl.
  *H04W 76/14* (2018.01)
  *G06F 3/14* (2006.01)
  *H04L 29/08* (2006.01)
  *B60K 35/00* (2006.01)
  *G09G 5/12* (2006.01)
  *H04W 12/00* (2009.01)
  *G06F 3/147* (2006.01)
  *H04W 4/80* (2018.01)
  *H04W 8/00* (2009.01)
  *H04W 4/48* (2018.01)
  *G06F 3/0484* (2013.01)

(56) References Cited

U.S. PATENT DOCUMENTS

| | | | | |
|---|---|---|---|---|
| 2008/0096484 | A1* | 4/2008 | Tuttle | H04B 5/0068 455/41.2 |
| 2008/0139116 | A1* | 6/2008 | Balgard | G08C 17/02 455/41.2 |
| 2010/0190440 | A1* | 7/2010 | Kim | H04M 1/7253 455/41.2 |
| 2011/0117845 | A1* | 5/2011 | Kirsch | H04M 1/6091 455/41.2 |
| 2012/0202428 | A1* | 8/2012 | Mirbaha | H04L 12/185 455/41.2 |
| 2014/0288526 | A1* | 9/2014 | Lemke | A61N 1/30 604/500 |
| 2014/0379920 | A1* | 12/2014 | Nathwani | H04W 4/04 709/226 |
| 2016/0007140 | A1* | 1/2016 | Yae | H04M 1/7253 455/41.2 |
| 2016/0057564 | A1* | 2/2016 | Sim | H04W 4/80 455/41.2 |
| 2016/0150066 | A1* | 5/2016 | Yae | H04M 1/6091 455/41.2 |
| 2016/0150588 | A1* | 5/2016 | Yae | H04L 67/12 455/41.2 |
| 2016/0155335 | A1* | 6/2016 | Backof, II | G08G 1/20 701/516 |
| 2017/0155749 | A1* | 6/2017 | Ranganathan | H04B 1/385 |
| 2017/0308075 | A1* | 10/2017 | Whitaker | B60W 10/04 |

OTHER PUBLICATIONS

Search Report issued to European counterpart application No. 17196778.9 by the EPO dated May 14, 2018, 8 pages.
"Bluetooth Pairing Instructions", Sep. 1, 2009, pp. 1-10, XP055164800, Retrieved from the Internet: URL:http://www.bmw.ca/ca/en/owners/navigation/bluetooth/_shared/pdf/Bluetooth_Pairing_PDF_en.pdf [retrieved on Jan. 26, 2015].

* cited by examiner

METHOD AND SYSTEM FOR PAIRING AUTHENTICATION BETWEEN A VEHICLE AND A MOBILE DEVICE

CROSS-REFERENCE TO RELATED APPLICATION

This application claims priority of Taiwanese Patent Application No. 106107149, filed on Mar. 6, 2017.

FIELD

The disclosure relates to a method and a system for pairing authentication, particularly between a vehicle and a mobile device.

BACKGROUND

Recently, some cars are built with Bluetooth communication function therein, so the car owner may establish Bluetooth communication between the car and a mobile phone thereby using speakers of the car to answer a phone call received by the mobile phone or to play music stored in the mobile phone. However, an unknown person may pair his own device to the car when the car is doing a pairing procedure that lacks a deliberate communication mechanism, resulting in inconvenience for the car owner.

SUMMARY

Therefore, an object of the disclosure is to provide a method and a system that have multiple confirmation mechanisms to ensure security of establishing wireless communication between a vehicle and a mobile device.

According to the disclosure, the method for pairing authentication between a vehicle and a mobile device is proposed. The vehicle includes an instrument cluster device, a power switch, and an execution operation component. The instrument cluster device includes a host computer, and a host display electrically coupled to the host computer. The host computer includes a processor module and a wireless communication device that is electrically coupled to the processor module. The method includes: when the power switch is changed from a non-conducting state to a conducting state, followed by triggering of the execution operation component, the processor module, in response to the triggering of the execution operation component, causing the host display to display a vehicle identification code corresponding to the vehicle, and causing the wireless communication device to send out the vehicle identification code; after the mobile device has searched out and displayed the vehicle identification code via an application executed thereby, and the vehicle identification code is selected for subsequent pairing operation through the application, the processor module causing the host display and the mobile device to display a pairing code at the same time; and, when a pairing procedure associated with the pairing code is operated on the mobile device and the host computer within a predetermined pairing operation period, the processor module completing pairing authentication between the host computer and the mobile device.

According to the disclosure, the system for pairing authentication between a vehicle and a mobile device is proposed to include a power switch, an execution operation component, a host display and a host computer. The power switch is to be disposed on the vehicle, and is operable to change between a non-conducting state and a conducting state. The execution operation component is to be disposed on the vehicle. The host display is to be disposed on the vehicle. The host computer is to be disposed on the vehicle, and includes a wireless communication device, and a processor module which is electrically coupled to the power switch, the execution operation component, the host display and the wireless communication device. The processor module is configured such that: (1) when the power switch is changed from the non-conducting state to the conducting state, followed by triggering of the execution operation component, the processor module, in response to the triggering of the execution operation component, causes the host display to display a vehicle identification code corresponding to the vehicle, and causes the wireless communication device to send out the vehicle identification code; (2) after the mobile device has searched out and displayed the vehicle identification code via an application executed thereby, and the vehicle identification code is selected for subsequent pairing operation through the application, the processor module causes the host display and the mobile device to display a pairing code at the same time; and (3) when a pairing procedure associated with the pairing code is operated on the mobile device and the host computer within a predetermined pairing operation period, the processor module completes pairing authentication between the host computer and the mobile device.

BRIEF DESCRIPTION OF THE DRAWINGS

Other features and advantages of the disclosure will become apparent in the following detailed description of the embodiments) with reference to the accompanying drawings, of which.

DETAILED DESCRIPTION

Figure 1:
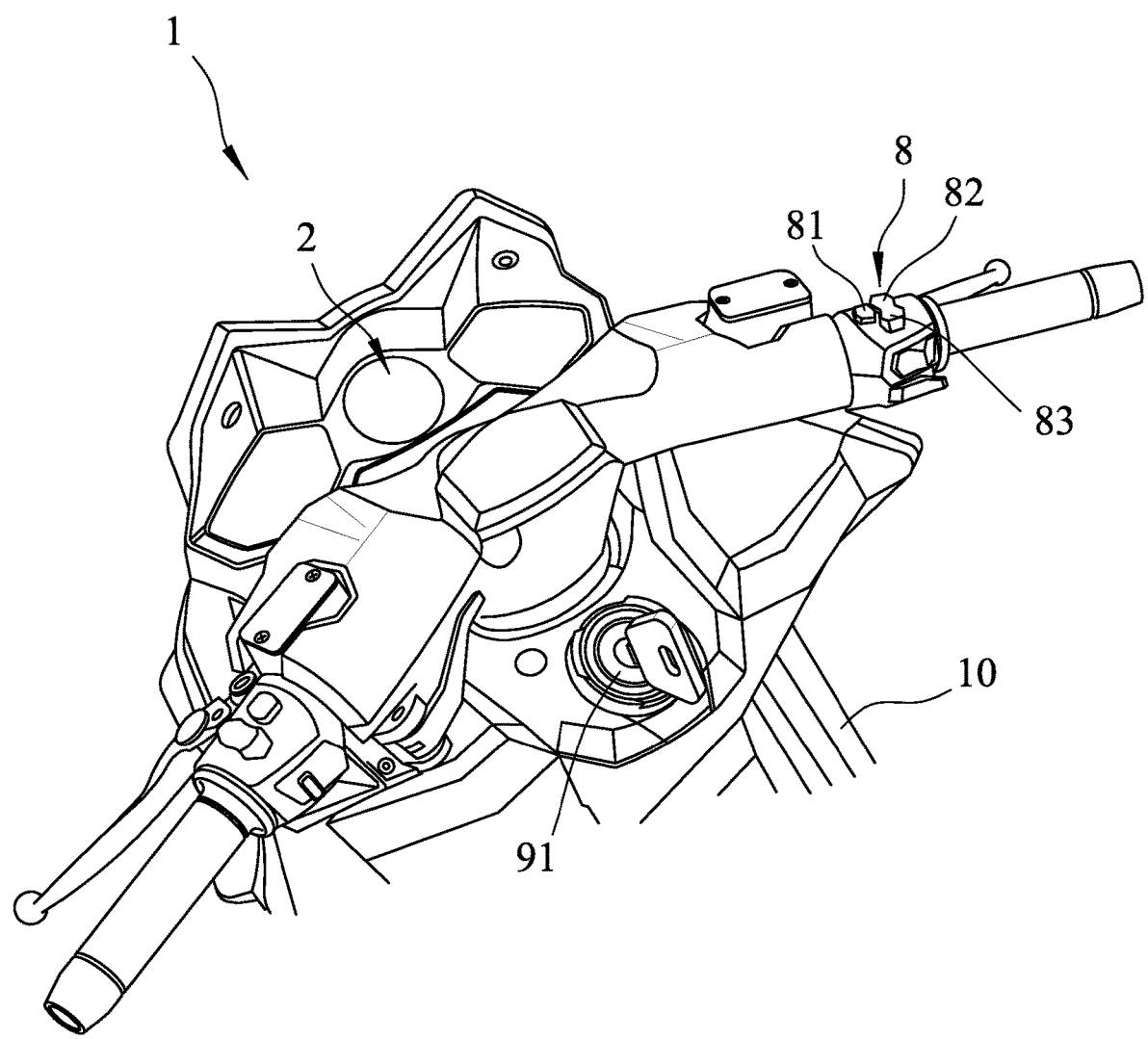
FIG. 1 is a fragmentary perspective view illustrating a vehicle used to implement an embodiment of a method for pairing authentication with a mobile device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
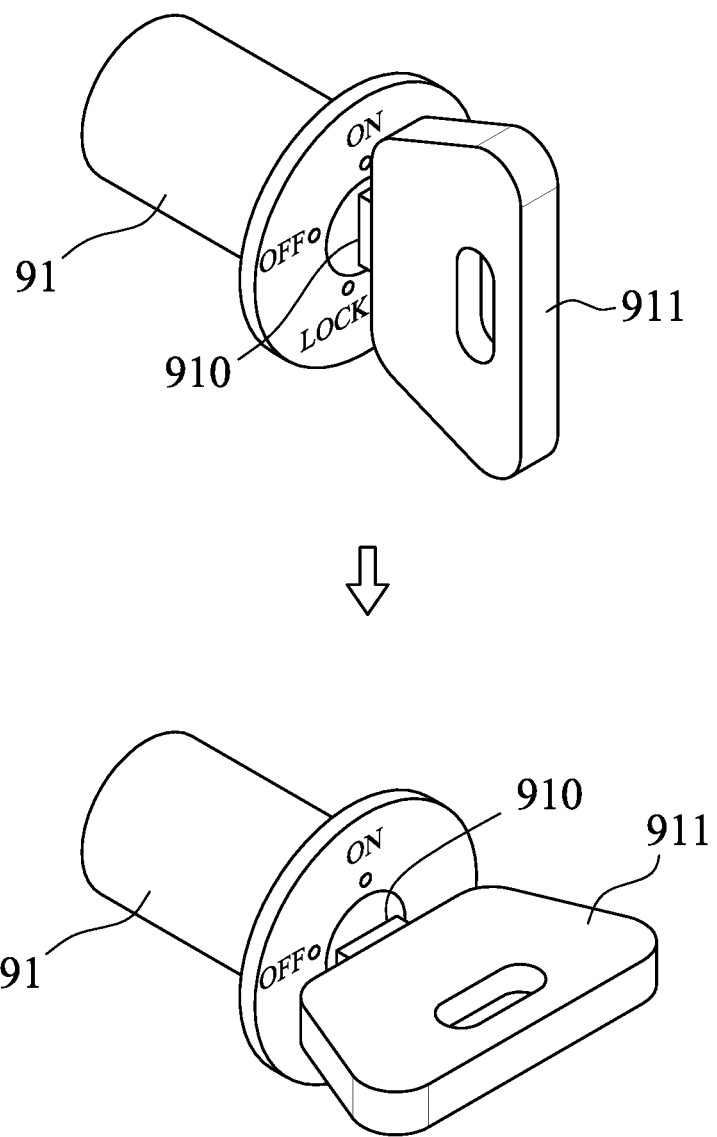
FIG. 2 is a perspective view illustrating a conducting state and a non-conducting state of a power switch of the vehicle.
Figure 3:
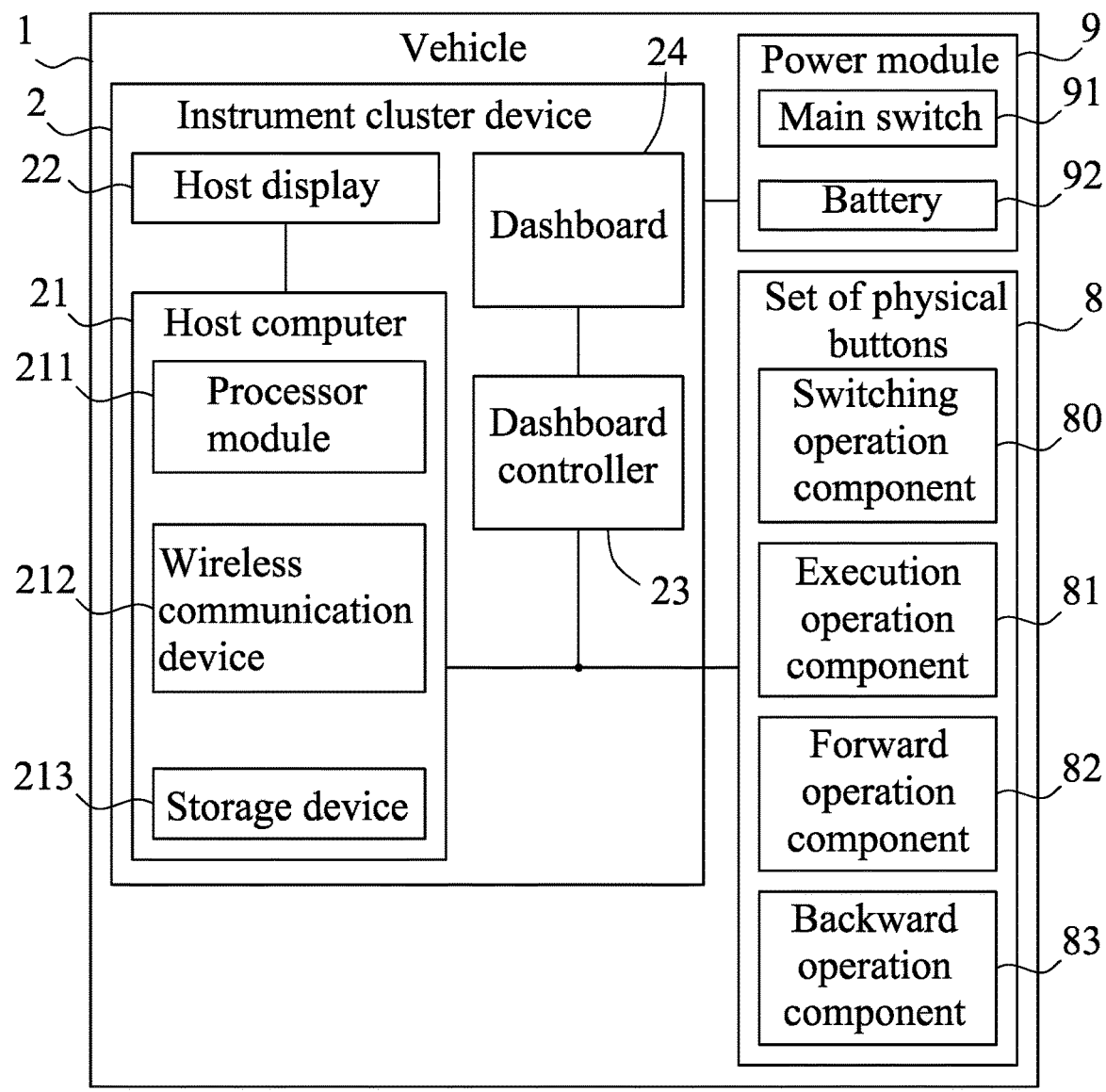
FIG. 3 is a block diagram illustrating the vehicle and the mobile device used to implement the embodiment.
Figure 3:
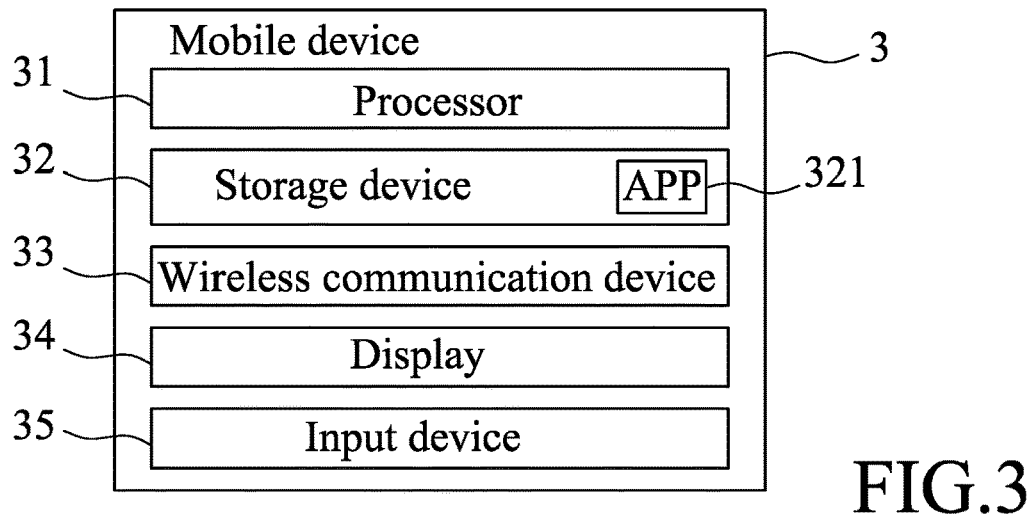

Referring to FIGS. 1 to 3, the embodiment of the system for pairing authentication according to this disclosure is shown to be implemented between a vehicle 1 (e.g., a motorcycle, a car, an all terrain vehicle, a utility vehicle, an electric vehicle, etc.) and a mobile device (e.g., a smartphone, a wearable device, a tablet computer, etc.).

The vehicle 1 includes a vehicle body 10, an instrument cluster device 2 disposed on the vehicle body 10, a power module 9 disposed on the vehicle body 10 and electrically coupled to the instrument cluster device 2, and a set of physical buttons 8 disposed on the vehicle body 10 and electrically coupled to the instrument cluster device 2.

Figure 4:
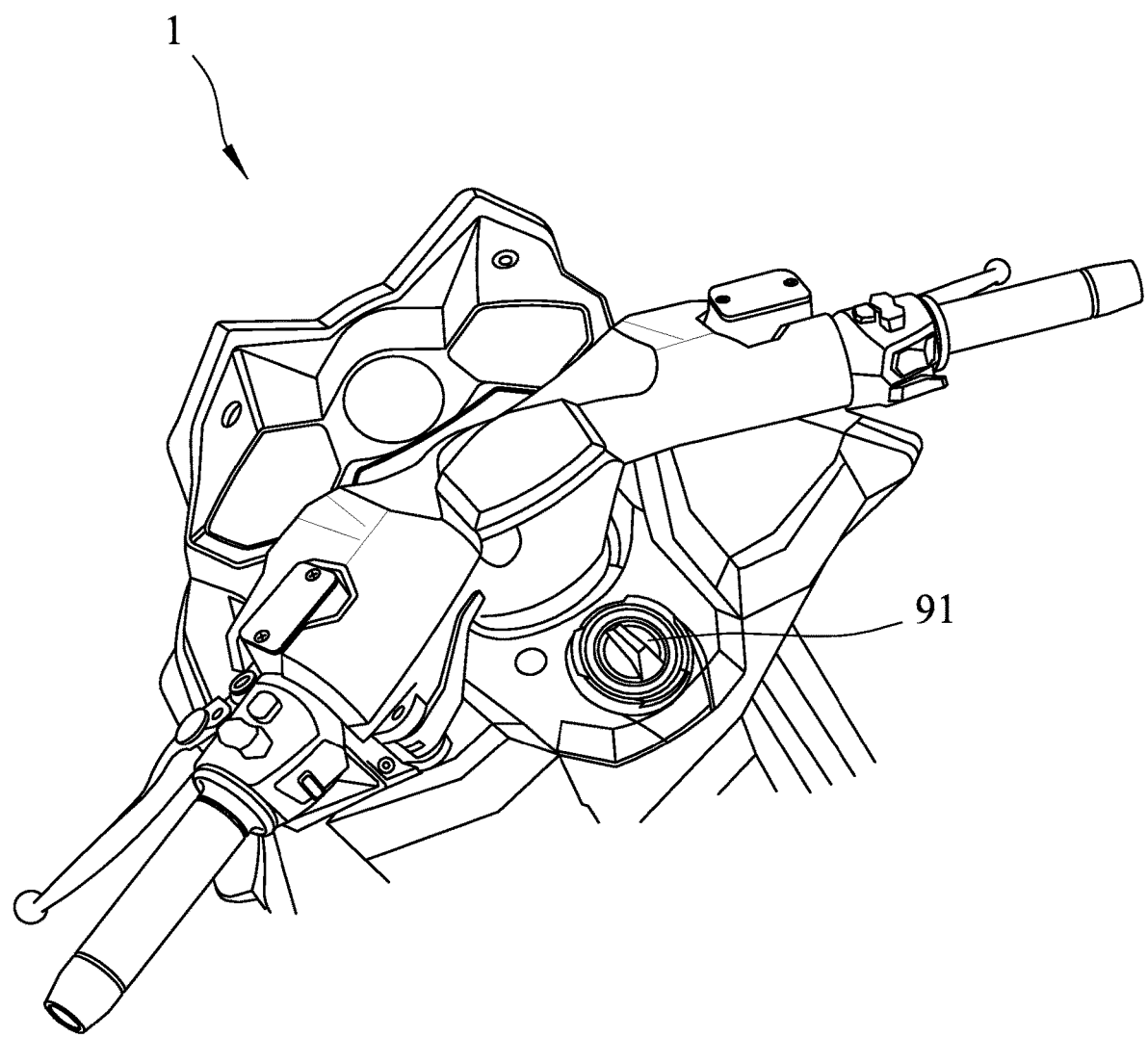
FIG. 4 is a fragmentary perspective view exemplifying a power switch in a keyless implementation.

In this embodiment, the power module 9 includes at least a power switch 91 formed with a keyhole 910 that is paired with a key 911, and a battery 92. The power switch 91 is operable to change between a non-conducting state and a conducting state, and allows provision of electric power from the battery 92 to electrically-powered components of vehicle 1 when conducting. In the case that the vehicle 1 is a motorcycle, the power switch 91 is a main switch of the vehicle 1. A user may switch the power switch 91 to the conducting state by inserting the key 911 into the keyhole 910 and rotating the key 911 in a clockwise direction to the "ON" position, as exemplified in the upper part of FIG. 2, for enabling power supply of the vehicle 1. A user may switch the power switch 91 to the non-conducting state by rotating the key 911 in a counterclockwise direction to the "OFF" position, as exemplified in the lower part of FIG. 2, for disabling power supply of the vehicle 1. In other embodiments, the power switch 91 may be implemented as for example, a keyless power switch 91 which may be realized in a form of a push button, a knob (see FIG. 4) rotatable after unlocking by chip induction, etc.

Figure 6:
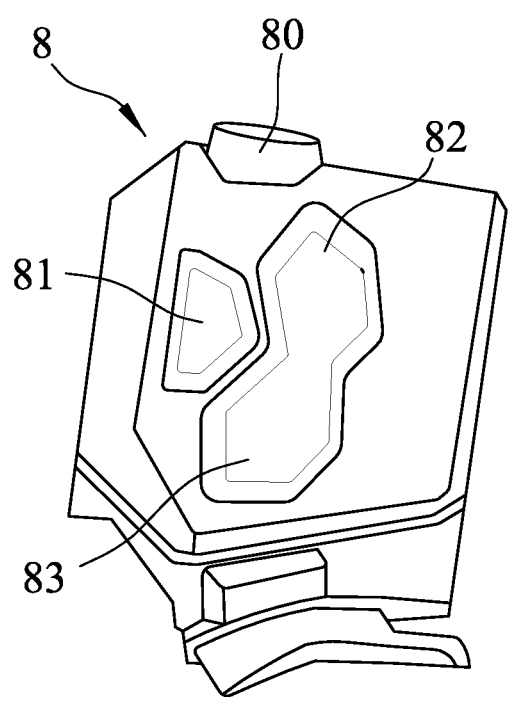
FIGS. 6 and 7 are schematic perspective views illustrating physical buttons of the vehicle from different angles, respectively.
Figure 7:
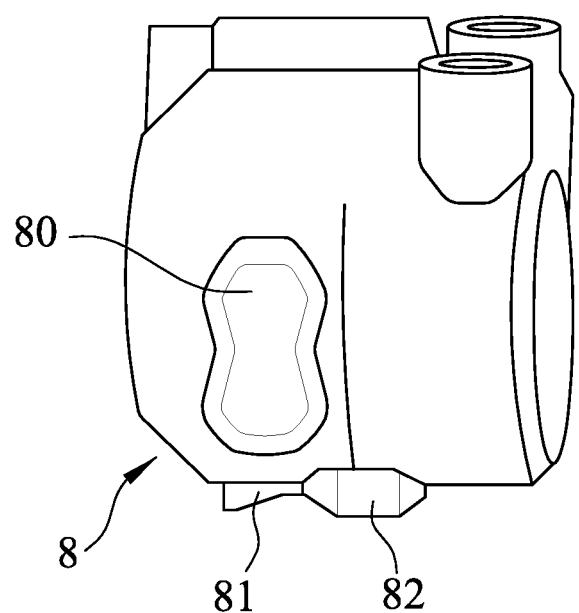
Figure 8:
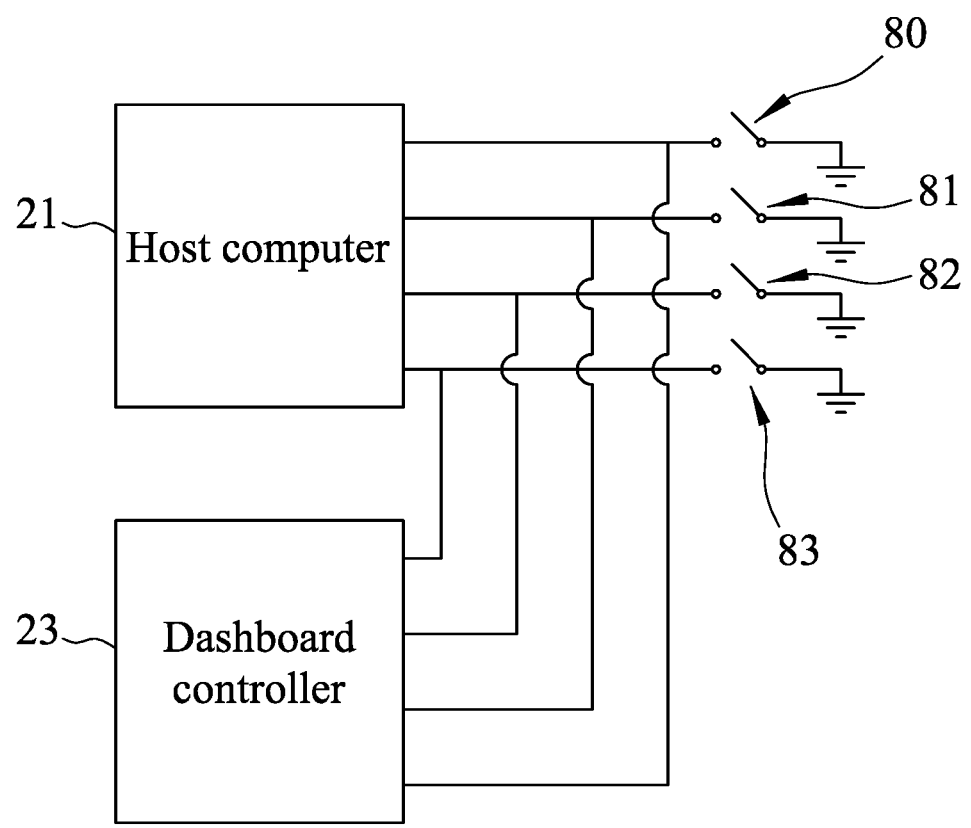
FIG. 8 is a schematic circuit diagram illustrating connections among a switching operation component, an execution operation component, a forward operation component, a backward operation component, a host computer and a dashboard controller of the vehicle.

Referring to FIGS. 1, 3, 5 and 8, the instrument cluster device 2 includes a host computer 21, a host display 22, e.g., a liquid crystal display, electrically coupled to the host computer 21, a dashboard controller 23, and a dashboard 24 electrically coupled to the dashboard controller 23. The host computer 21 and the dashboard controller 23 are both electrically coupled to the set of physical buttons 8 for receiving signals responsive to user operations. Further referring to FIGS. 6 and 7, the set of physical buttons 8 includes a switching operation component 80, an execution operation component 81, a forward operation component 82 and a backward operation component 83, each of which is electrically coupled to both of the host computer 21 and the dashboard controller 23. In this embodiment, the switching operation component 80 and the execution operation component 81 are disposed on a driving area of the vehicle 1 (e.g., a grip portion for a motorcycle, a steering wheel or a panel in front of the driver for a car, etc.) for facilitating driver operation of the pairing authentication, and may be implemented as separate buttons. The forward operation component 82 and the backward operation component 83 may be made in one piece as for example, a single "dual-switch" button, and disposed in the vicinity of the execution operation component 81 on the driving area for reducing the number of parts and facilitating driving operation.

Figure 5:
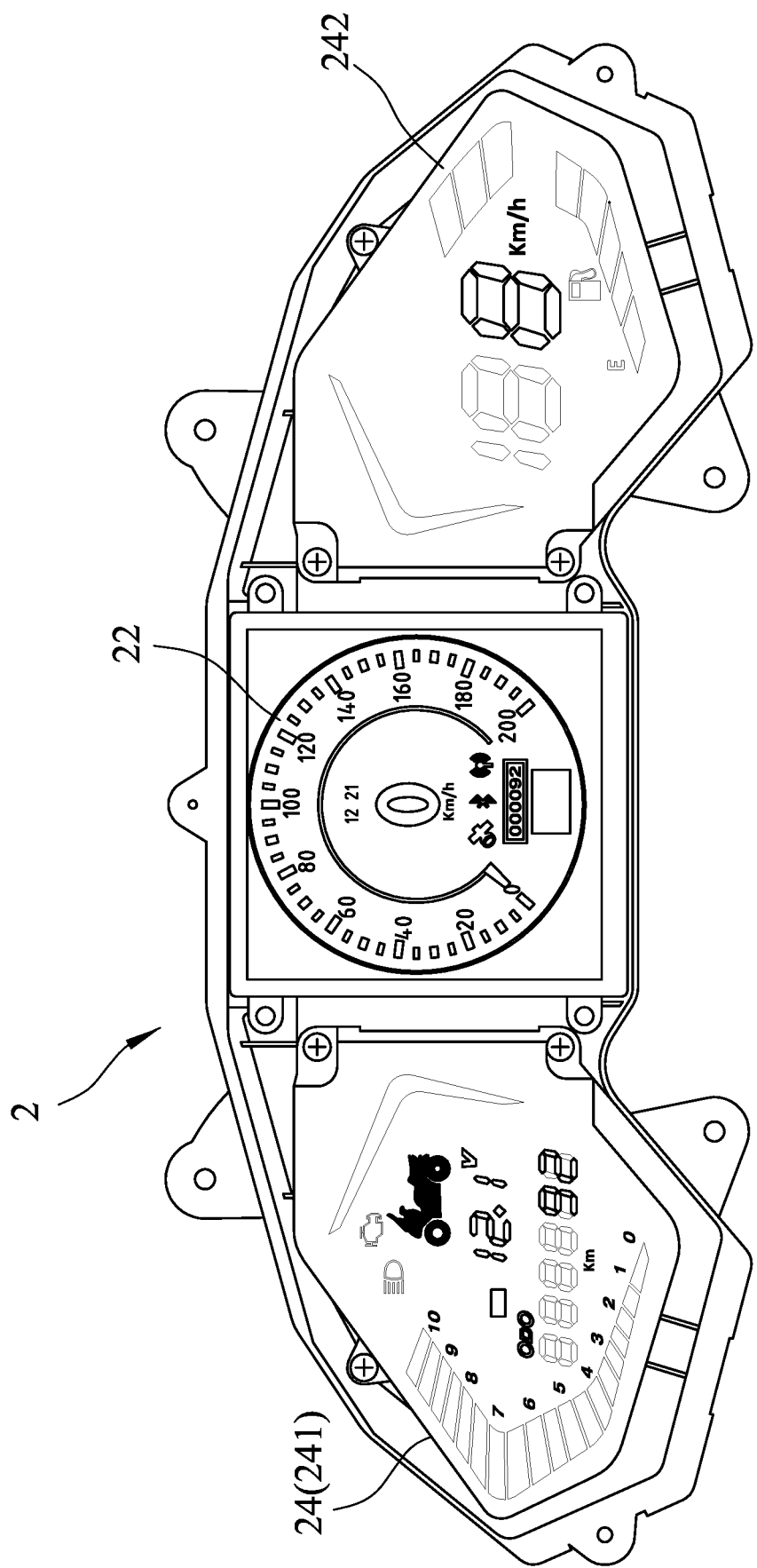
FIG. 5 is a schematic diagram illustrating a host display and a dashboard of the vehicle.

In FIG. 5, the dashboard 24 may be either a digital dashboard or an analog dashboard in this embodiment, and is configured to include a first part 241 and a second part 242 respectively on a left side and a right side of the host display 22, and to display instrument cluster information such as an accumulated traveling distance of the vehicle 1, a traveling distance of an individual trip, a current voltage of the battery 92, a current speed of the vehicle 1, a current fuel level, current tire pressures, etc. The host display 22 may switch between operation in a wireless communication display mode and operation in a dashboard display mode, with the operation mode being set by operating the switching operation component 80. Upon user operation of the switching operation component 80, and depending thereon, the host computer 21 is triggered to control or cause the host display 22 to operate in a corresponding one of the wireless communication display mode and the dashboard display mode. After the host computer 21 controls the host display 22 to operate in the wireless communication display mode, the host computer 21 is capable of wireless communication with the mobile device 3, and the host computer 21 causes the host display 22 to display the current speed of the vehicle 1 and information associated with intelligent functions such as time, weather conditions, intelligent compass, notification and car finder. After the host computer 21 controls the host display 22 to operate in the dashboard display mode, the host computer 21 causes the host display 22 to display at least a portion of the instrument cluster information based on user selection. For example, when the backward operation component 83 is triggered (e.g., being pressed), the host computer 21 may cause the host display 22 to display the accumulated travelling distance of the vehicle 1, the travelling distance of an individual trip and/or the current fuel level, where a unit of distance displayed by the host display 22 may be switched between for example kph (kilometers per hour) and mph (miles per hour) by triggering the execution operation component 81; and when the forward operation component 82 is triggered, the host computer 21 may cause the host display 22 to display the current tire pressures and/or the current voltage of the battery 92.

In this embodiment, the system for pairing authentication according to this disclosure includes the power switch 91, the switching operation component 80, the execution operation component 81, the forward and backward operation components 82, 83, the host computer 21 and the host display 22, but this disclosure is not limited to such configuration. As exemplified in FIG. 3, the host computer 21 includes a processor module 211 (e.g., a central processor and its peripheral components, etc.), a wireless communication device 212 (e.g., a Bluetooth module, a Wi-Fi module, a near field communication module, etc.) and a storage device 213 (e.g., a flash memory, etc.). The processor module 211 is electrically coupled to the power module 9, the switching operation component 80, the execution operation component 81, the forward and backward operation components 82, 83, the host display 22, the wireless communication device 212 and the storage device 213.

The mobile device 3 includes a processor 31, a storage device 32 storing an application 321 for performing the pairing authentication, a wireless communication device 33, a display 34 and an input device 35. The wireless communication device 33 is configured with a wireless communication technology which is the same as that used by the wireless communication device 212, and is thus capable of establishing wireless communication with the wireless communication device 212. For example, when the wireless communication device 212 of the host computer 21 is a Bluetooth module, the wireless communication device 33 of the mobile device 3 must also be (or at least include) a Bluetooth module for establishing the wireless communication with the wireless communication device 212.

Figure 9:
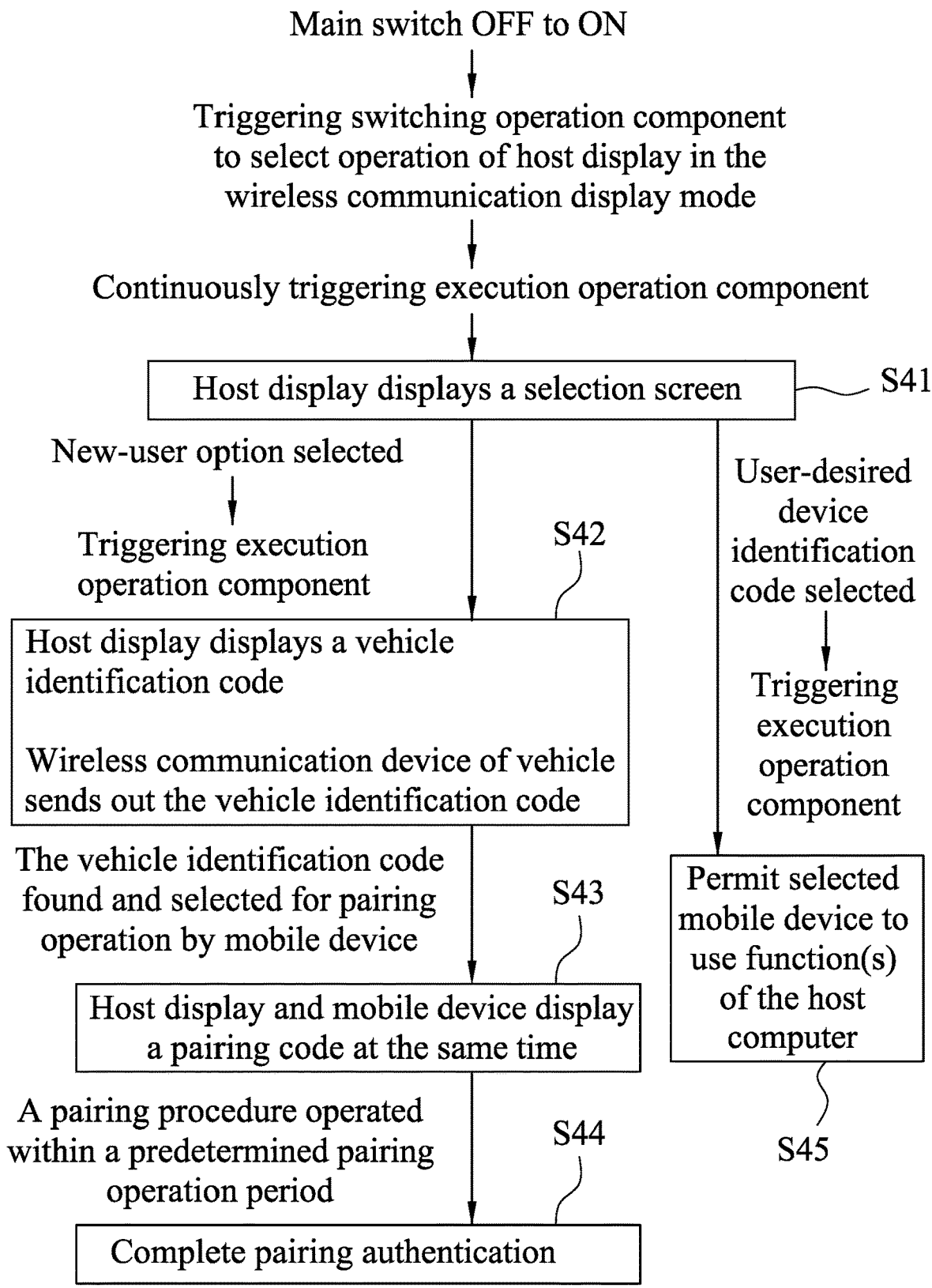
FIG. 9 is a flow chart illustrating steps of the embodiment.
Figure 10:
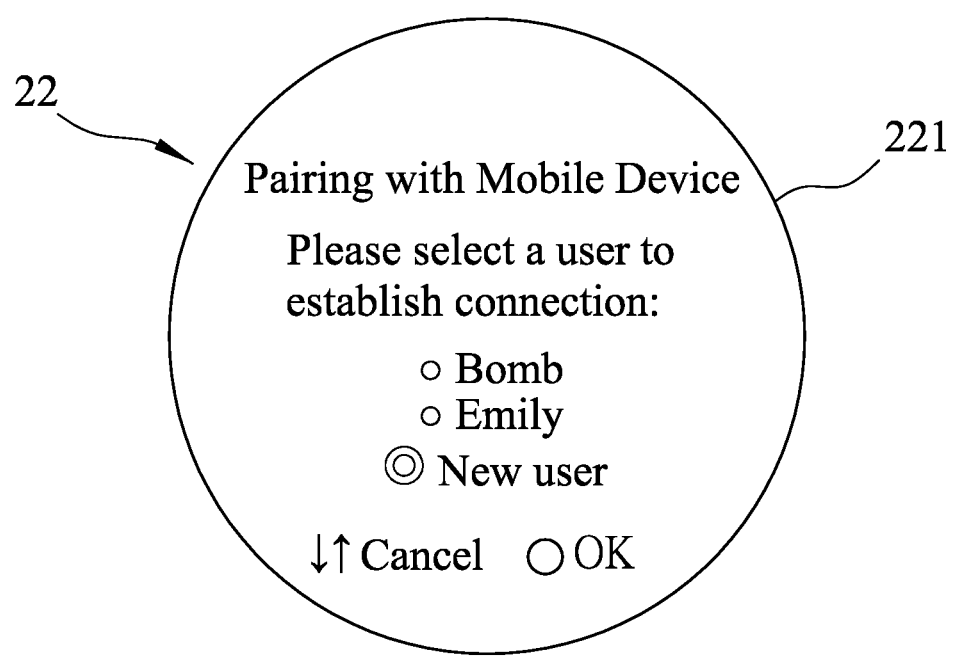
FIG. 10 is a schematic diagram illustrating a selection screen displayed on the host display of the vehicle.

FIG. 9 is a flow chart of the embodiment of the method for pairing authentication between the vehicle 1 and the mobile device 3 according to this disclosure. With further reference to FIGS. 2 and 3, when the user rotates the key 911 to change the power switch 91 from the non-conducting state (i.e., when the key 911 is at the "OFF" position) to the conducting state (i.e., when the key 911 is at the "ON" position), followed by triggering the switching operation component 80 to select operation of the host display 22 in the wireless communication display mode, and then continuously triggering the execution operation component 81 for at least a predetermined triggering period (e.g., five seconds), the flow enters step S41, in which the processor module 211 of the host computer 21 causes the host display 22 to display a selection screen 221 that shows at least a new-user option, as shown in FIG. 10 (where "Bomb" and "Emily" are user-defined identification codes corresponding to mobile devices that have previously completed the pairing authentication with the host computer 21, which will be explained hereinafter).

Figure 11:
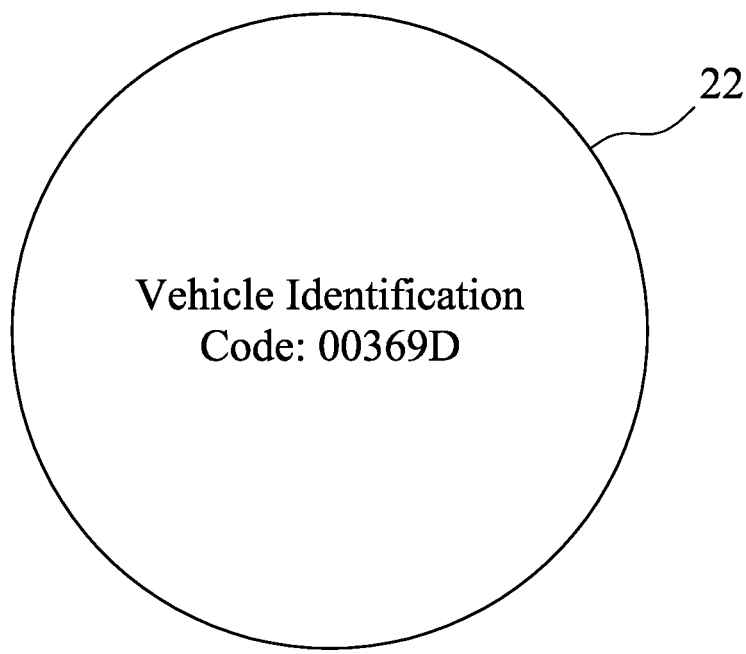
FIG. 11 is a schematic diagram illustrating a vehicle identification code displayed on the host display.

After the user selects the new-user option (e.g., moving a cursor to a position corresponding to the new-user option) followed by triggering of the execution operation component 81, the flow goes to step S42, in which the processor module 211 causes, in response to the triggering of the execution operation component 81 following the new user option being selected (i.e., receipt of a signal generated from the triggering of the execution operation component 81), the host display 22 to display a vehicle identification code (e.g., the code "00369D" shown in FIG. 11) corresponding to the vehicle 1 and causes the wireless communication device 212 to send out the vehicle identification code. The operation of the switching operation component 80 in step S41 and the operation of the execution operation component 81 in step S42 cooperatively establish a double confirmation for activating the pairing authentication process, avoiding misoperation by the user.

Figure 12:
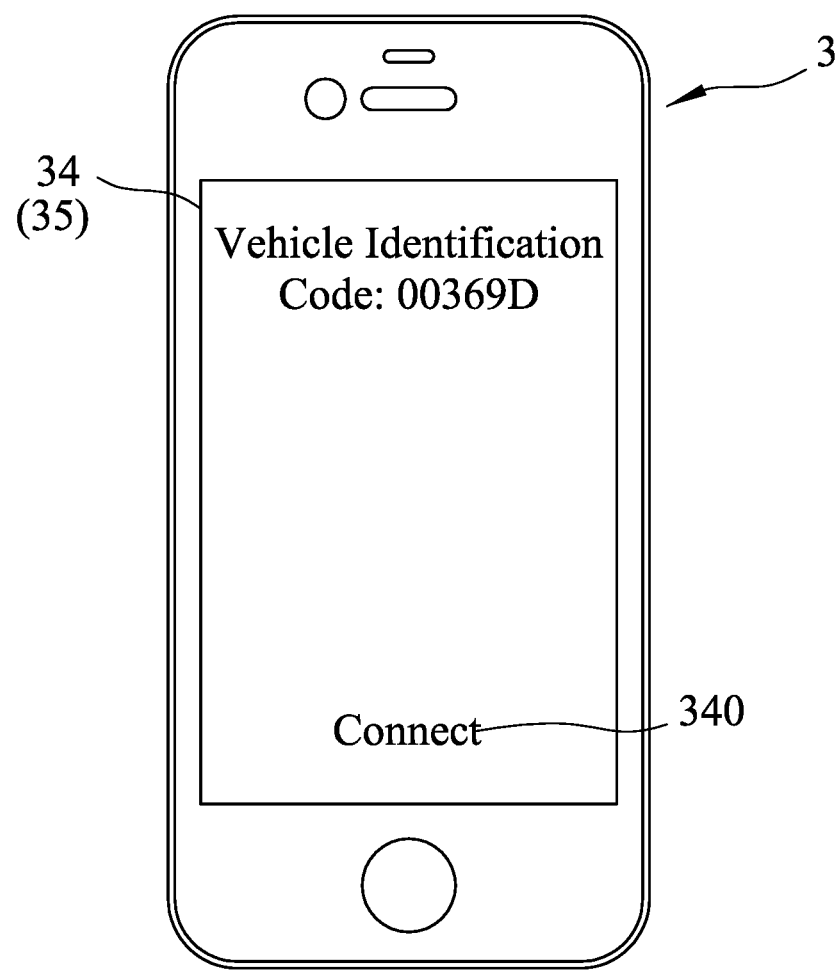
FIG. 12 is a schematic diagram illustrating the vehicle identification code displayed on the mobile device.
Figure 13:
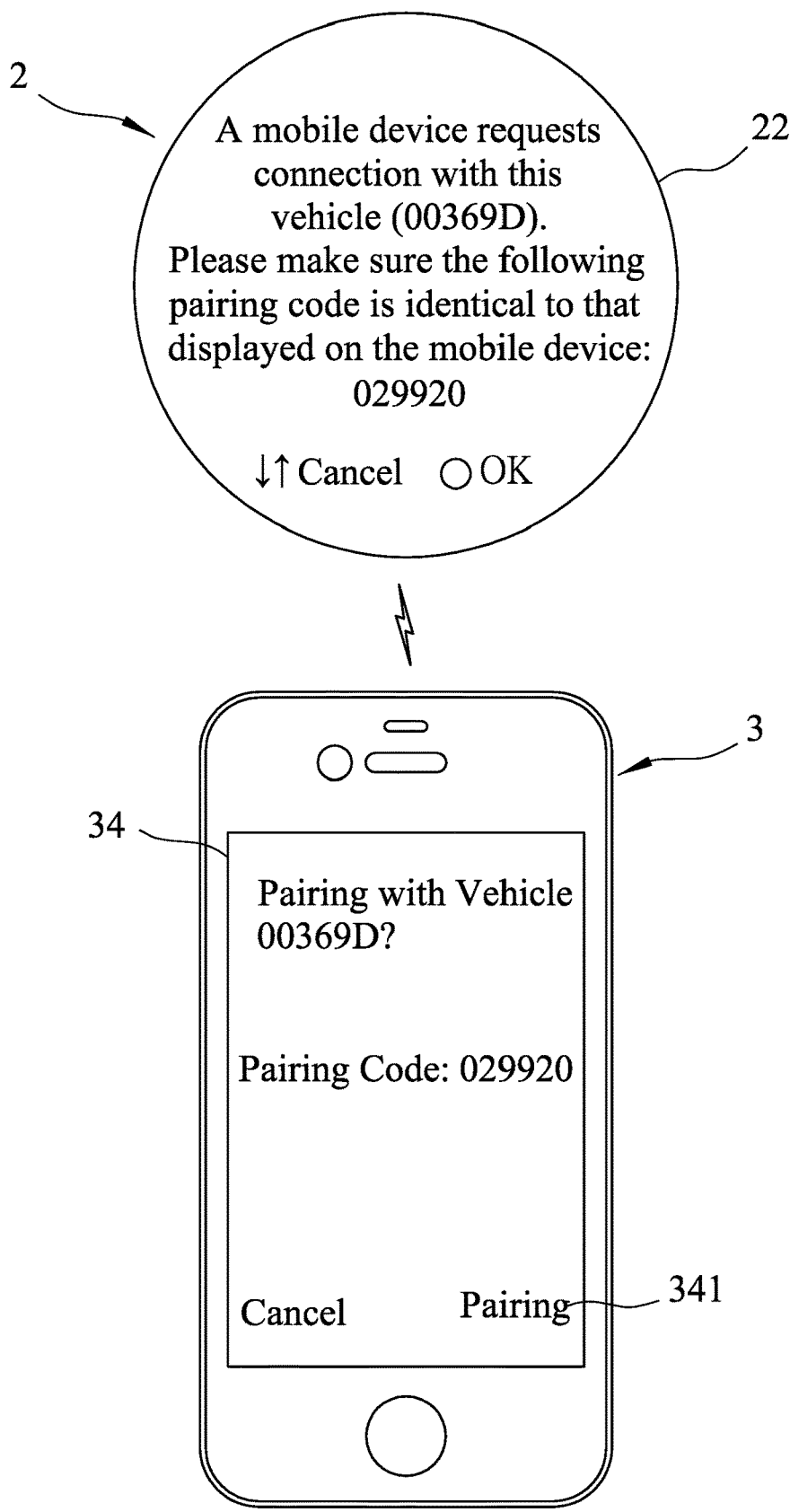
FIG. 13 is a schematic diagram illustrating a pairing code displayed on both of the host display and the mobile device at the same time.

Then, the user may use the input device 35 of the mobile device 3 to execute the application 321 to search for the vehicle identification code sent out by the host computer 21. In this embodiment, the display device 34 and the input device 35 are integrated as a touch screen, as shown in FIG. 12, so that the user may view the content displayed by the mobile device 3 and perform input operation by touch control via the touch screen. After the mobile device 3 has searched out and displayed the vehicle identification code via the application executed thereby, and the vehicle identification code is selected (e.g., by triggering the button "Connect" 340 of a pairing interface on the mobile device 3, as shown in FIG. 12) for subsequent pairing operation through the application, the flow goes to step S43, in which the processor module 211 sends out signals indicating a pairing code to cause/enable the host display 212 and the display 34 of the mobile device 3 to display the pairing code (e.g., the code "029920" shown in FIG. 13), which is randomly generated, at the same time (i.e., the processor module 211 sends the signals indicating the pairing code to the host display 212 and the mobile device 3, so that the host display 212 displays the pairing code, and the mobile device 3 controls the display 34 thereof to display the pairing code).

When the user operates a pairing procedure associated with the pairing code on the mobile device 3 and the host computer 21 within a predetermined pairing operation period (e.g., 30 seconds), the flow goes to step S44, in which the processor module 211 causes the wireless communication device 212 to establish wireless communication with the wireless communication device 33, and completes pairing authentication between the host computer 21 and the mobile device 3. In this embodiment, the pairing procedure may include: triggering the execution operation component 81 for confirmation of the pairing code by the host computer 21 within the predetermined pairing operation period, and triggering a "Pairing" button 341 (see FIG. 13) of the pairing interface on the mobile device 3 to confirm the pairing code within the predetermined pairing operation period. The procedure of confirming the pairing code on both of the host computer 22 and the mobile device 3 establishes a double confirmation for completing the pairing authentication between the host computer 21 and the mobile device 3, preventing the pairing authentication from completion without permission by the owner/user of the vehicle 1.

In this embodiment, the processor module 211 stores a user-defined identification code corresponding to the mobile device 3 in step S44 for completing the pairing authentication between the host computer 21 and the mobile device 3. As an example, when the mobile device that has a user-defined identification code of "Bomb" has finished the abovementioned steps S41-S44, the processor module 211 may store the user-defined identification code "Bomb" in the storage device 213 to represent that the mobile device "Bomb" (i.e., the mobile device having the user-defined identification code "Bomb") has completed the pairing authentication with the host computer 21.

Then, the next time the flow enters step S41 (triggering by the user rotating the key 911 to change the power switch 91 from the non-conducting state to the conducting state, followed by triggering the switching operation component 80 to select operation of the host display 22 in the wireless communication display mode, and then continuously triggering the execution operation component 81 for at least the predetermined triggering period), the processor module 211 causes the host display 22 to display the selection screen 221 that shows the new-user option and the user-defined identification code of "Bomb", as exemplified in FIG. 10 (where "Emily" is a user-defined identification code of another mobile device that has completed the pairing authentication with the host computer 21). In this embodiment, the user-defined identification code may be formed in compliance with a wireless communication technology used for communication between the host computer 21 and the mobile device 3, such as Wi-F, near field communication, Bluetooth, etc.

When the user selects a desired user-defined identification code (e.g., moving the cursor to "Bomb" in FIG. 10) in the selection screen 221 in step S41 followed by triggering the execution operation component 81, the flow goes to step S45, in which the processor module 211 causes the wireless communication device 212 to establish wireless communication with the wireless communication device 33, and permits the mobile device 3 that corresponds to the selected user-defined identification code to use one or more functions of the host computer 21 via the wireless communication. In other words, after the power switch 91 is switched from the non-conducting state to the conducting state, if among those mobile devices that have completed the pairing authentication with the host computer 21 (e.g., the mobile device "Bomb" and the mobile device "Emily" as exemplified in FIG. 10), one or more are near the host computer 21, the user may select whichever one that is near the host computer 21, as desired, to establish communication with the host computer 21 by selecting the corresponding user-defined identification code displayed on the selection screen 221 followed by triggering the execution operation component 81, thereby only permitting the mobile device corresponding to the selected user-defined identification code to use the intelligent functions of the host computer 21 via wireless communication, such as displaying the current vehicle speed, time, weather conditions, the intelligent compass, the notification and the car finder, etc.

In one implementation, the processor module 211 may automatically establish wireless communication between the host computer 21 and a mobile device that has completed the pairing authentication with the host computer 21 when the power switch 91 is changed from the non-conducting state to the conducting state and the host computer 21 controls the host display 22 to operate in the wireless communication display mode and is capable of wireless communication. In a case where there exists more than one mobile device that has already completed the pairing authentication with the host computer 21, the processor module 211 may automatically establish wireless communication between the host computer 21 and one of the mobile devices preceding the other mobile device(s) in an order in which the pairing authentications corresponding to the mobile devices were completed. For example, assuming in FIG. 10 that the mobile device "Bomb" is first in order (i.e., has the first priority), and the mobile device "Emily" is second in order (i.e., has the second priority) (i.e., the mobile device "Bomb" completed the pairing authentication prior to the mobile device "Emily"), when the user rotates the key 911 to change the power switch 91 from the non-conducting state to the conducting state and the host display 22 is controlled by the host computer 21 to operate in the wireless communication display mode (may also be referred to as the vehicle 1 being in a wireless communication mode), the host computer 21 will automatically establish the wireless communication with the mobile device "Bomb" which has the first priority if the user does not trigger the execution operation component 81 to select the desired user-defined identification code, and cause the mobile device "Bomb" to use the intelligent functions of the host computer 21 after establishing the wireless communication therewith.

Figure 14:
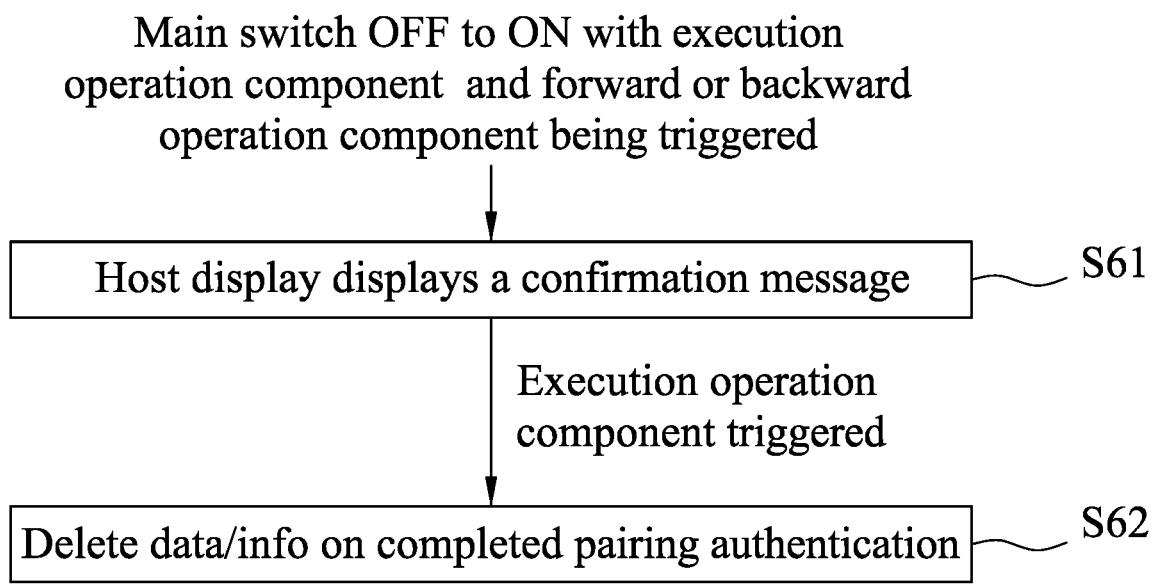
FIG. 14 is a flow chart illustrating steps of deleting data corresponding to completed pairing authentication(s).

Referring to FIGS. 2, 3 and 14, the embodiment may further include steps for deleting the data/information (e.g., the user-defined identification code) corresponding to the completed pairing authentication(s) on record. When the power switch 91 is changed from the non-conducting state to the conducting state under a condition in which the execution operation component 81 and one of the forward and backward operation components 82, 83 are triggered (e.g., being pressed) at the same time, the flow enters step S61, in which the processor module 211 causes the host display 22 to display a confirmation message for confirming whether the user desires to delete the data/information corresponding to the pairing authentication(s) on record. After the user triggers the execution operation component 81 to confirm deletion of the data/information corresponding to the previous pairing authentication(s) on record, the flow goes to step S62, in which the processor module 211 deletes the data/information corresponding to all of the pairing authentication(s) from the storage device 213. In practice, this procedure may be performed when the user sells the vehicle 1 to another person. In a variation, the abovementioned deletion procedure may be performed via the application 321 of the mobile device 3. For instance, when the mobile device 3 is in communication with the host computer 21, the user may trigger a factory reset function via the application 321 executed by the mobile device 3 so that, when the host computer 21 receives, via the wireless communication, a signal that indicates a factory reset operation resulting from the triggering of the factory reset function, the processor module 211 causes the host display 22 to display the confirmation message, followed by triggering the execution operation component 81 to complete deletion of, e.g., all of the user-defined identification code(s) corresponding to the mobile devices that have previously completed the pairing authentication and stored in the storage device 213.

In summary, the embodiment according to this disclosure has at least the following advantages:

1. The pairing authentication process is started only when the power switch 91 is in the conducting state and the execution operation component 81 is triggered, thus preventing the pairing authentication process from beginning without permission of the vehicle owner/driver. After completion of the pairing authentication, the mobile device 3 may activate the intelligent functions of the host computer 21 via wireless communication.

2. With the double confirmation mechanism practiced through the requirement of both the operation of the switching operation component 80 and the execution operation component 81 to initiate the activation of the pairing authentication process, misoperation by the user may be prevented.

3. The pairing code is confirmed on both of the host computer 21 (by triggering the execution operation component 81) and the mobile device 3 within the predetermined pairing operation period, forestalling any pairing authentication being established without permission of the vehicle owner/driver.

4. When the power switch 91 is changed from the non-conducting state to the conducting state and one or more mobile devices that have completed the pairing authentication are nearby the vehicle 1, the user may select one of the mobile devices to establish communication with by selecting the corresponding user-defined identification code followed by triggering the execution operation component 81, so only the selected mobile device is permitted to use the intelligent functions of the host computer 21 via wireless communication.

5. The deletion procedure allows the user to delete all the data/information of the completed matching authentications on record before transferring ownership of the vehicle 1 to another person; and the new vehicle owner may establish his/her own pairing authentication from the start.

6. When the power switch 91 is changed from the non-conducting state to the conducting state and more than one mobile device that has completed the matching authentication is nearby the vehicle 1, the host computer 21 may automatically establish wireless communication with one of these mobile devices that precedes the other(s) of these mobile devices in an order in which these mobile devices completed the pairing authentication with the host computer 21, and the one mobile device that establishes the wireless communication with the host computer 21 can use the intelligent functions of the host computer 21 via the wireless communication.

7. The embodiment enables the user to completely delete information corresponding to previously completed pairing authentications via the application 321 of the mobile device 3.

8. The forward and backward operation components 82, 83 are formed in one piece, so a number of parts can be reduced; and by configuring the forward and backward operation components 82, 83 in the driving area of the vehicle 1 (e.g., the grips of a motorcycle, the steering wheel of a car, etc.), operability of the pairing authentication may be enhanced.

9. By configuring the switching operation component 80 and the execution operation component 81 in the driving area of the vehicle 1, operability of the pairing authentication may be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for pairing authentication between a motorcycle and a mobile device, the motorcycle including an instrument cluster device, a power switch, a switching operation component, a dashboard to display instrument cluster information, and an execution operation component; the instrument cluster device including a host computer, and a host display electrically coupled to the host computer; the host computer including a processor module and a wireless communication device that is electrically coupled to the processor module; said method comprising:

when the power switch is changed from a non-conducting state to a conducting state, followed by triggering of the execution operation component, the processor module, in response to the triggering of the execution operation component, causing the host display to display a vehicle identification code corresponding to the motorcycle, and causing the wireless communication device to send out the vehicle identification code;

after the mobile device has searched out and displayed the vehicle identification code via an application executed thereby, and the vehicle identification code is selected for subsequent pairing operation through the application, the processor module enabling the host display and the mobile device to display a pairing code at the same time;

when a pairing procedure associated with the pairing code is operated on the mobile device and the host computer within a predetermined pairing operation period, the processor module completing pairing authentication between the host computer and the mobile device;

wherein:

when the host display is switched by the switching operation component to operate in a wireless communication display mode, the host computer permits the mobile device that has completed the pairing authentication to use function of the host computer via wireless communication, and when the host display is switched by the switching operation component to operate in a dashboard display mode, the host display is caused by the host computer to display at least a portion of the instrument cluster information; and wherein the processor module causing the host display to display the vehicle identification code corresponding to the motorcycle, and causing the wireless communication device to send out the vehicle identification code includes:

after the switching operation component is operated to select operation in a wireless communication mode followed by the execution operation component being continuously triggered for at least a predetermined triggering period, the processor module causing the host display to display a selection screen that shows a new-user option, and after the new-user option is selected according to the selection screen followed by triggering of the execution operation component, the processor module causing, in response to the triggering of said execution operation component following the new-user option being selected, the host display to display the vehicle identification code and causing the wireless communication device to send out the vehicle identification code.

2. The method as claimed in claim 1, the host computer further including a storage device electrically coupled to the processor module, wherein completing the pairing authentication between the host computer and the mobile device includes the processor module storing a user-defined identification code of the mobile device in the storage device, said method further comprising:

after the pairing authentication is completed and the user-defined identification code is stored in the storage device, when the power switch is again changed from the non-conducting state to the conducting state, followed by the switching operation component being operated to select operation in the wireless communication mode and then the execution operation component being continuously triggered for at least the predetermined pairing operation period, the processor module causing the host display to display the selection screen that shows the user-defined identification code of the mobile device that has completed the pairing authentication with the host computer; and after the user-defined identification code is selected on the selection screen followed by triggering of the execution operation component, the processor module permitting the mobile device corresponding to the user-defined identification code thus selected to use a function of the host computer via wireless communication.

3. The method as claimed in claim 2, wherein the user-defined identification code is in compliance with a wireless communication technology which is one of Wi-Fi, near field communication and Bluetooth.

4. The method as claimed in claim 1, wherein the pairing procedure includes:

the execution operation component being triggered for confirmation of the pairing code by the host computer within the predetermined pairing operation period; and a pairing interface on the mobile device being operated to confirm the pairing code within the predetermined pairing operation period.

5. The method as claimed in claim 1, the motorcycle further including a forward operation component and a backward operation component that are disposed in a vicinity of the execution operation component, said method further comprising:

after the processor module has completed the pairing authentication between the host computer and the mobile device, when the power switch is changed from the non-conducting state to the conducting state under a condition in which the execution operation component and at least one of the forward operation component and the backward operation component are triggered at the same time, the processor module causing the host display to display a confirmation message for confirming deletion of data corresponding to the pairing authentication; and when the execution operation component is triggered following the host display displaying the confirmation message, the processor module deleting the data corresponding to the pairing authentication.

6. The method as claimed in claim 1, the host computer further including a storage device that is electrically coupled to the processor module and that stores a plurality of user-defined identification codes respectively corresponding to a plurality of mobile devices each of which has completed the pairing authentication with the host computer, said method further comprising:

when the power switch is changed from the non-conducting state to the conducting state and the motorcycle is in a wireless communication mode, the processor module automatically establishing wireless communication between the host computer and one of the plurality of mobile devices according to an order in which the pairing authentications corresponding to the plurality of mobile devices were completed; and the processor module permitting the one of the plurality of mobile devices that has established the wireless communication with the host computer to use a function of the host computer via the wireless communication.

7. The method as claimed in claim 1, further comprising:

after the processor module has completed the pairing authentication between the host computer and the mobile device, when the host computer has established wireless communication with the mobile device and the processor module receives, via the wireless communication, a reset signal that indicates a factory reset operation resulting from a factory reset function being triggered via the application executed by the mobile device, followed by the execution operation component being triggered, the processor module deleting data corresponding to the pairing authentication that has been completed.

8. A system for pairing authentication between a motorcycle and a mobile device, comprising:

a power switch to be disposed on the motorcycle, and operable to change between a non-conducting state and a conducting state;

an execution operation component to be disposed on the motorcycle;

a host display to be disposed on the motorcycle;

a host computer to be disposed on the motorcycle, and including a wireless communication device, and a processor module which is electrically coupled to said power switch, said execution operation component, said host display and said wireless communication device;

a switching operation component to be disposed on the motorcycle and electrically coupled to said processor module;

a dashboard configured to display instrument cluster information; and a dashboard controller electrically coupled to said dashboard and said switching operation component;

wherein said processor module is configured such that:

when said power switch is changed from the non-conducting state to the conducting state, followed by triggering of said execution operation component, said processor module, in response to the triggering of said execution operation component, causes said host display to display a vehicle identification code corresponding to the motorcycle, and causes said wireless communication device to send out the vehicle identification code;

after the mobile device has searched out and displayed the vehicle identification code via an application executed thereby, and the vehicle identification code is selected for subsequent pairing operation through the application, said processor module enables said host display and the mobile device to display a pairing code at the same time; and when a pairing procedure associated with the pairing code is operated on the mobile device and said host computer within a predetermined pairing operation period, said processor module completes pairing authentication between said host computer and the mobile device;

wherein to cause said host display to display the vehicle identification code corresponding to the motorcycle, and cause said wireless communication device to send out the vehicle identification code, said processor module is configured to:

after said switching operation component is operated to select operation in a wireless communication mode followed by said execution operation component being continuously triggered for at least a predetermined triggering period, cause said host display to display a selection screen that shows a new-user option; and after the new-user option is selected on the selection screen followed by triggering of said execution operation component, cause, in response to the triggering of said execution operation component following the new-user option being selected, said host display to display the vehicle identification code and cause said wireless communication device to send out the vehicle identification code; and wherein said switching operation component is operable to switch operation of said host display between a wireless communication display mode, where during operation of said host display in the wireless communication display mode, said host computer permits the mobile device that has completed the pairing authentication to use function of said host computer via wireless communication, and an dashboard display mode, where said host display is caused by said host computer to display at least a portion of the instrument cluster information.

9. The system as claimed in claim 8, wherein said execution operation component and said switching operation component are to be disposed on a driving area of the motorcycle.

10. The system as claimed in claim 8, wherein the pairing procedure includes:

said execution operation component being triggered for confirmation of the pairing code by said host computer within the predetermined pairing operation period; and a pairing interface on the mobile device being operated to confirm the pairing code within the predetermined pairing operation period.

11. The system as claimed in claim 8, further comprising a forward operation component and a backward operation component that are electrically coupled to said processor module and that are made in one piece and disposed in a vicinity of said execution operation component on a driving area of the motorcycle.

12. The system as claimed in claim 8, wherein said wireless communication device is one of a Wi-Fi module, a near field communication module and a Bluetooth module, said power switch is a main switch of the motorcycle, and said host display is a liquid crystal display.

13. The system as claimed in claim 8, the mobile device is one of a smartphone, a wearable device and a tablet computer.

14. The system as claimed in claim 8, wherein said power switch is a main switch of the motorcycle.

* * * * *